(12) United States Patent
Chen et al.

(10) Patent No.: US 12,283,082 B1
(45) Date of Patent: Apr. 22, 2025

(54) METHOD AND SYSTEM FOR QUANTIFYING SEMANTIC VARIANCE BETWEEN NEURAL NETWORK REPRESENTATIONS

(71) Applicant: SOUTHEAST UNIVERSITY, Nanjing (CN)

(72) Inventors: Hao Chen, Nanjing (CN); Haoran Zhou, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/844,395

(22) PCT Filed: Apr. 30, 2024

(86) PCT No.: PCT/CN2024/090949
§ 371 (c)(1),
(2) Date: Sep. 6, 2024

(87) PCT Pub. No.: WO2025/020619
PCT Pub. Date: Jan. 30, 2025

(30) Foreign Application Priority Data

Jul. 26, 2023 (CN) .......................... 202310922777.2

(51) Int. Cl.
*G06V 10/75* (2022.01)
*G06V 10/77* (2022.01)
*G06V 10/82* (2022.01)
(52) U.S. Cl.
CPC ........ *G06V 10/755* (2022.01); *G06V 10/7715* (2022.01); *G06V 10/82* (2022.01)

(58) Field of Classification Search
CPC ... G06V 10/755; G06V 10/7715; G06V 10/82
See application file for complete search history.

(56) References Cited

U.S. PATENT DOCUMENTS

2023/0084910 A1    3/2023   Wang et al.

FOREIGN PATENT DOCUMENTS

| CN | 110647992 A | 1/2020 |
| CN | 114549832 A | 5/2022 |

(Continued)

OTHER PUBLICATIONS

Fong et al, "Net2Vec: Quantifying and Explaining how Concepts are Encoded by Filters in Deep Neural Networks", 2018, arXiv: 1801.03454v2 [cs.CV] (9 Pages) (Year: 2018).*

(Continued)

*Primary Examiner* — David F Dunphy
(74) *Attorney, Agent, or Firm* — Bayramoglu Law Offices LLC

(57) ABSTRACT

A method and system for quantifying semantic variance between neural network representations is provided. Two neural network representations to be compared are first extracted, the weight of each filter in an intermediate layer corresponding to each semantic concept is learned on a reference dataset using the Net2Vec method, then set IoU of each representation for all semantic concepts in the reference dataset are calculated, and finally variance between the set IoU of the two representations for all the semantic concepts are integrated to obtain semantic variance between the two neural network representations. The method solves the problem of lack of accurate measurement on the variance between neural network representations on a semantic information level, and has an accurate measurement effect.

8 Claims, 1 Drawing Sheet

(56) References Cited

FOREIGN PATENT DOCUMENTS

CN    114970820 A    8/2022
CN    116992930 A    11/2023

OTHER PUBLICATIONS

David Bau, et al., Network Dissection: Quantifying Interpretability of Deep Visual Representations, CVF, pp. 6541-6549.
Ruth Fong, et al., Net2Vec: Quantifying and Explaining how Concepts are Encoded by Filters in Deep Neural Networks, CVF, pp. 8730-8738.

* cited by examiner

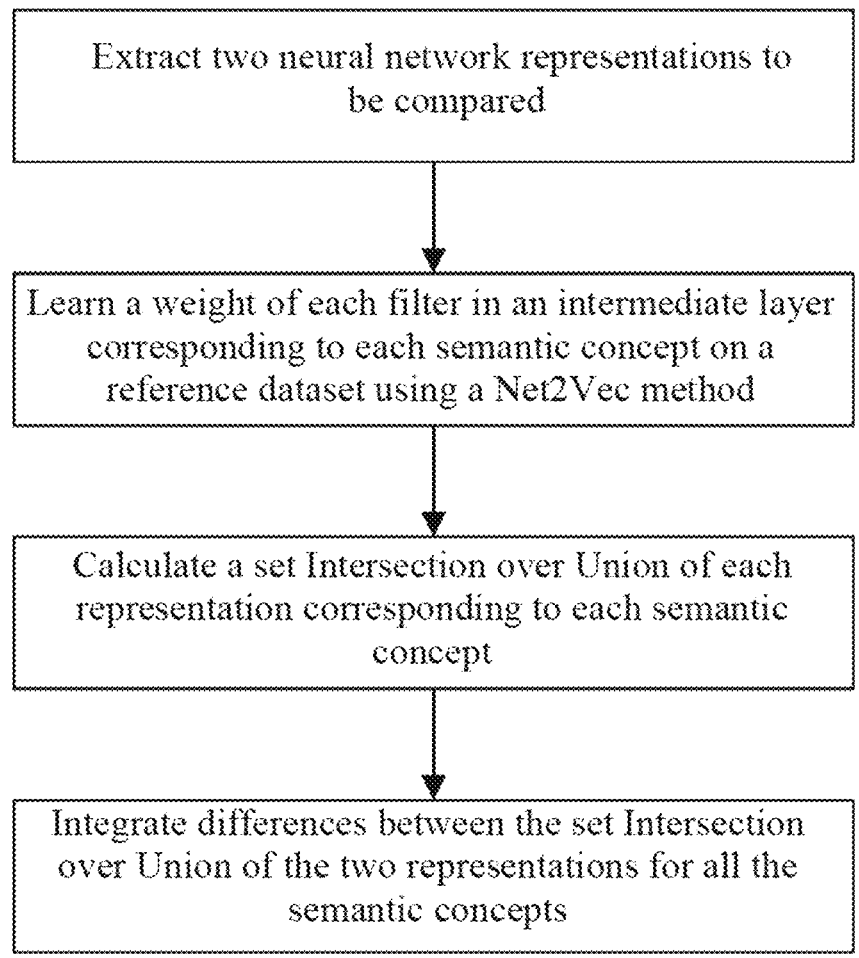

METHOD AND SYSTEM FOR QUANTIFYING SEMANTIC VARIANCE BETWEEN NEURAL NETWORK REPRESENTATIONS

CROSS REFERENCE TO THE RELATED APPLICATIONS

This application is the national phase entry of International Application No. PCT/CN2024/090949, filed on Apr. 30, 2024, which is based upon and claims priority to Chinese Patent Application No. 202310922777.2, filed on Jul. 26, 2023, the entire contents of which are incorporated herein by reference.

TECHNICAL FIELD

The present invention belongs to the technical field of computer vision and interpretability, and specifically relates to a method and system for quantifying semantic variance between neural network representations.

BACKGROUND

In recent years, although deep neural networks have achieved significant effects in various types of tasks, they are still mysterious "black boxes". Visualizing semantic concepts encoded in intermediate layers of neural networks is a natural way to interpret the neural networks. Activation maximization is to find a representative feature that can maximize the activation of a neuron, channel, or layer. People can use visualization results to roughly decode the semantic concepts contained in the intermediate layers of the neural networks. For example, low-level filters usually encode basic concepts such as edges and textures, while high-level filters often encode advanced objects and patterns. In addition to visualization, some researchers are dedicated to exploring the relationships between intermediate layer filters and semantic concepts. Reference "David Bau, Bolei Zhou, Aditya Khosla, Aude Oliva, and Antonio Torralba. Network dissection: Quantifying interpretability of deep visual representations. In *Proc. CVPR*, 2017" collects a novel dataset BRODEN, provides pixel-level labels for visual concepts, and discovers alignment between individual filters and specific concepts. Reference "Ruth Fong and Andrea Vedaldi. Net2vec: Quantifying and explaining how concepts are encoded by filters in deep neural networks. In *Proc. CVPR*, 2018." demonstrates how a DNN uses a plurality of filters to represent specific semantic concepts, and researches embedding of concepts through a combination of the plurality of filters. However, most existing research only visualizes or statistically distributes the semantic concepts contained in neural network representations, that is, collects statistics on distribution forms such as the number of filters or an IoU value corresponding to each semantic concept in representations, which cannot measure semantic information variance between two neural network representations. When the internal mechanism of a neural network is analyzed, various variance between two neural network representations, such as semantic information variance, usually need to be analyzed. Therefore, it is urgent to solve the problem that the semantic information variance between two neural network representations cannot be measured.

SUMMARY

In view of the problems existing in the prior art, the present invention provides a method and system for quantifying semantic variance between neural network representations, where two neural network representations to be compared are first extracted, weights of each filter in an intermediate layer corresponding to each semantic concept is learned on a reference dataset using Net2Vec method, then set Intersection over Union (IoU) of each representation for all semantic concepts in the reference dataset are calculated, and finally variance between the set IoU of the two representations for all the semantic concepts are integrated to obtain semantic variance between the two neural network representations. The method solves the problem of lack of accurate measurement on the variance between neural network representations on a semantic information level, and has an accurate measurement effect.

In order to achieve the above objectives, the technical solution adopted by the present invention is: a method for quantifying semantic variance between neural network representations, comprising the following steps:

S1. extracting representations: predicting, on a reference dataset, with two neural networks required for feature extraction, and in the prediction process, retaining intermediate layer output of the neural networks when predicting each sample;

S2. learning weights: learning the weight of each filter in an intermediate layer corresponding to each semantic concept on the reference dataset using Net2Vec method;

S3. calculating set IoU: linearly superimposing, using the weights learned in step S2, activation values of the filters in the intermediate layer output retained in step S1 to obtain a total activation value corresponding to each semantic concept, then binarizing the total activation value to obtain a mask of each sample corresponding to each semantic concept, and calculating the set IoU of each representation corresponding to each semantic concept;

S4. integrating variance: calculating variance between the set IoU of the representations of the two neural networks for all semantic concepts, and integrating the variance to obtain semantic variance between two neural network representations.

As an improvement of the present invention, the Net2Vec method in step S2 is specifically as follows:

calculating a predicted segmentation mask M(x; w) using a Sigmoid function a according to the following equation:

$$M(x; w) = \sigma\left(\sum_{k} w_k \cdot A_k(x)\right)$$

wherein $w \in R^K$ is a weight to be learned, K is the total number of filters in the intermediate layer, and $A_k(x)$ is an activation map of the $k^{th}$ filter for input x;

learning the weight w for the concept c by minimizing the binary cross entropy loss function of the following equation:

$$\mathcal{L}_1 = -\frac{1}{N_c} \sum_{x \in X_c} \alpha M(x; w) L_c(x) + (1-\alpha)(1 - M(x; w))(1 - L_c(x))$$

wherein $N_c$ is the number of samples containing the concept c, $x \in X_c$ represents the samples containing the concept c, and $\alpha = 1 - E_{x \in X_c} |L_c(x)|/S$, wherein $|L_c(x)|$ is the number of foreground pixels of the concept c in the ground truth mask of the sample x, and $S=h_s \cdot w_s$ is the total number of pixels in the ground truth mask.

As an improvement of the present invention, in step S3, for the set IoU of the concept c:

$$IoU_{set}(c; M) = \frac{\sum_{x-X_c} |M(x) \cap L_c(x)|}{\sum_{x-X_c} |M(x) \cup L_c(x)|}$$

wherein $L_c$ is the ground truth segmentation mask.

As an improvement of the present invention, in step S4, the variance between the set IoU of the representations of the two neural networks for all semantic concepts are integrated as follows:

$$S.\text{Var}(R_2; R_1) = \sum_{j=1}^{c} \frac{\alpha S.\text{Var}_j^1 + \lambda(1-\alpha)S.\text{Var}_j^2}{\frac{\sum_{x \in X_R} |L_j(x)|}{|X_R|S}}$$

wherein $\alpha = I$ (min $(IoU_{set}(c_j; R_2), IoU_{set}(c_j; R_1)) > 0$) determines whether the concept $c_j$ is a common concept between two representations, $\alpha = 1$ if $c_j$ is a common concept, otherwise $\alpha = 0$, $I(\cdot)$ is an indicator function, $X_R$ is a reference dataset, $|L_j(x)|$ is the number of foreground pixels of the concept $c_j$ in the ground truth mask of the sample x, $|X_R|$ is the total number of samples in the reference dataset, $S=h_s \cdot w_s$ is the total number of pixels in the ground truth mask, $S \cdot \text{Var}_j^1$ is the semantic variance of common semantic concepts between representations $R_1$ and $R_2$ of the two neural networks, $S \cdot \text{Var}_j^2$ is the semantic variance of non-common semantic concepts between two representations, and $\lambda$ is a weight for the concept that newly appears or disappears in representation $R_2$ compared to representation $R_1$.

As an improvement of the present invention, the semantic variance of common semantic concepts between representations $R_1$ and $R_2$ of the two neural networks is calculated according to the following equation to obtain the semantic variance of $R_2$ relative to $R_1$:

$$S.\text{Var}_j^1 = \frac{IoU_{set}(c_j; R_2) - IoU_{set}(c_j; R_1)}{\max(IoU_{set}(c_j; R_2), IoU_{set}(c_j; R_1))}$$

wherein $IoU_{set}(c_j; R_i)_{j=1-c}$ is the set IoU of the representation $R_i$ corresponding to each semantic concept, and C is the total number of concepts;

the semantic variance of non-common semantic concepts between two representations is calculated according to the following equation to obtain the semantic variance of $R_2$ relative to $R_1$:

$$S \cdot \text{Var}_j^2 = \frac{IoU_{set}(c_j; R_2) - IoU_{set}(c_j; R_1)}{\frac{1}{C}\sum_{k=1}^{C} IoU_{set}(c_k; R_1)}.$$

As a further improvement of the present invention, the value of $\lambda$ is 2.

In order to achieve the above objectives, the technical solution adopted by the present invention is: a system for quantifying semantic variance between neural network representations, comprising a computer program, characterized in that the steps of any above method are implemented when the computer program is executed by a processor.

Compared with the prior art, the present invention has the following technical advantages and technical effects: The present invention designs a method and system for quantifying semantic variance between neural network representations, which calculate set IoU of the representations corresponding to each semantic concept and integrate variances between the set IoU of the representations for all semantic concepts to obtain the semantic variance between two representations. The present invention solves the problem that semantic information variance between neural network representations cannot be measured, and provides a method for accurately measuring the variance between neural network representations on a semantic information level in the field of interpretability. The Net2Vec method is used to learn a weight of each filter in an intermediate layer corresponding to each semantic concept on a reference dataset, and different weights are assigned in consideration of learning difficulties in common and non-common semantic concepts between two representations, so the measurement results are accurate and the measurement conforms to experimental experience. The present invention can be used for comparing the semantic variance between representations in different intermediate layers of neural networks, thereby analyzing internal mechanisms of the neural networks semantically. The present invention can also be used for measuring the semantic variance between different modal representations in a form of activation maps, such as RGB modality, depth modality, and infrared modality, thereby providing a semantic measurement method for analyzing the variance between different modal representations of multi-modal neural networks.

BRIEF DESCRIPTION OF THE DRAWINGS

FIGURE is a flowchart of method steps for quantifying semantic variance between neural network representations according to the present invention.

DETAILED DESCRIPTION OF THE EMBODIMENTS

The present invention will be further illustrated below in conjunction with the accompanying drawings and specific embodiments. It should be understood that the following specific embodiments are only used to illustrate the present invention and not to limit the scope of the present invention.

Embodiment 1

As shown in FIGURE, a method for quantifying semantic variance between neural network representations is implemented as follows:

Step S1. Extract representations of two neural networks (such as ResNet50) to be compared: Predict, on a reference dataset (such as a BRODEN dataset), the neural networks required for feature extraction, and in the prediction process, retain intermediate layer output of the neural networks when predicting each sample.

Step S2. Learn the weight of each filter in an intermediate layer corresponding to each semantic concept on the reference dataset using the Net2Vec method:

First, the weight to be learned is represented by $w \in R^K$, where K is the total number of filters in the intermediate layer, and a predicted segmentation mask M(x; w) is calculated using a Sigmoid function σ according to the following equation:

$$M(x; w) = \sigma\left(\sum_{k} w_k \cdot A_k(x)\right)$$

where $A_k(x)$ is an activation map of the $k^{th}$ filter for input x;

Then, the weight w for the concept c is learned by minimizing the binary cross entropy loss function of the following equation:

$$\mathcal{L}_1 = -\frac{1}{N_c}\sum_{x \in X_c} \alpha M(x; w)L_c(x) + (1-\alpha)(1 - M(x; w))(1 - L_c(x))$$

where $N_c$ is the number of samples containing the concept c, $x \in X_c$ represents the samples containing the concept c, and $\alpha = 1 - \sum_{x \in X_c} |L_c(x)|/S$, where $|L_c(x)|$ is the number of foreground pixels of the concept c in the ground truth mask of the sample x, and $S = h_s \cdot w_s$ is the total number of pixels in the ground truth mask;

Then, on the reference dataset, 30epoch is trained to obtain the weight corresponding to each semantic concept using an SGD optimizer with a learning rate set to 0.0001, a momentum set to 0.9, and a batch size set to 64.

Step S3. Calculate a set IoU of each representation corresponding to each semantic concept: first learn the weight of each filter in the intermediate layer corresponding to each semantic concept using the Net2Vec method, then linearly superimpose, using the learned weights, activation values of the filters in the intermediate layer output retained in the previous step to obtain a total activation value corresponding to each semantic concept, binarize the total activation value to obtain a mask of each sample corresponding to each semantic concept, and finally calculate the set IoU of each representation corresponding to each semantic concept;

Specific steps are as follows:

The set IoU for the concept c is calculated according to the following equation:

$$IoU_{set}(c; M) = \frac{\sum_{k \in X_c} |M(x) \cap L_c(x)|}{\sum_{k \in X_c} |M(x) \cup L_c(x)|}$$

For the weight w of the concept c, this equation calculates an IoU (Jaccard coefficient) between the segmentation mask M after binarization of the total activation value obtained by linearly superimposing the activation values of the filters, and the ground truth segmentation mask $L_c$;

The corresponding set IoU is calculated for each semantic concept.

Step S4. Integrate variance between the set IoU of two representations for all semantic concepts;

The step of integrating variance between the set IoU of two representations for all semantic concepts is as follows:

First, $R_1$ and $R_2$ represent representations of two neural networks, and $IoU_{set}(c_j; R_i)_{j=1-c}$ represents a set IoU of the representation $R_i$ corresponding to each semantic concept, where C is the total number of concepts. the semantic variance of common semantic concepts between the two representations is calculated according to the following equation to obtain the semantic variance of $R_2$ relative to $R_1$:

$$S \cdot Var_j^1 = \frac{IoU_{set}(c_j; R_2) - IoU_{set}(c_j; R_1)}{\max(IoU_{set}(c_j; R_2), IoU_{set}(c_j; R_1))}$$

Then, the semantic variance of non-common semantic concepts between two representations is calculated according to the following equation to obtain the semantic variance of $R_2$ relative to $R_1$:

$$S \cdot Var_j^2 = \frac{IoU_{set}(c_j; R_2) - IoU_{set}(c_j; R_1)}{\frac{1}{C}\sum_{k=1}^{C} IoU_{set}(c_k; R_1)}$$

Finally, the semantic variance of all semantic concepts are integrated from the above two equations according to the following equation to calculate final semantic variance between the two neural network representations:

$$S \cdot Var(R_2; R_1) = \sum_{j=1}^{c} \frac{\alpha S \cdot Var_j^1 + \lambda(1-\alpha)S \cdot Var_j^2}{\frac{\sum_{k \in X_R}|L_j(x)|}{|X_R|S}}$$

where $\alpha = I$ (min ($IoU_{set}(c_j; R_2)$, $IoU_{set}(c_j; R_1)$)>0) determines whether the concept $c_j$ is a common concept between two representations, $\alpha=1$ if $c_j$ is a common concept, otherwise $\alpha=0$, $I(\cdot)$ is an indicator function, $X_R$ is a reference dataset, $|L_j(x)|$ is the number of foreground pixels of the concept $c_j$ in the ground truth mask of the sample x, $|X_R|$ is the total number of samples in the reference dataset, and $S = h_s \cdot w_s$ is the total number of pixels in the ground truth mask.

$\lambda = 2$ is set to emphasize the semantic variance caused by non-common concepts between two representations, namely, newly added or disappearing semantic concepts of $R_2$ relative to $$R_1, \frac{\sum_{k \in X_R}|L_j(x)|}{|X_R|S}$$

is a pixel ratio of the concept $c_j$ in the entire reference dataset, and the semantic variance of each semantic concept are divided by this equation to eliminate semantic concept proportion deviations in the reference dataset.

When the semantic variance $S \cdot Var(R_2; R_1)$ is positive, it indicates that $R_2$ has richer semantic information than $R_1$, and vice versa.

It should be noted that the above content only explains the technical idea of the present invention and cannot limit the scope of protection of the present invention thereby. For those of ordinary skill in the art, many improvements and modifications can be made without departing from the principle of the present invention, and these improvements and modifications fall within the scope of protection of the claims of the present invention.

What is claimed is:

1. A method for quantifying semantic variance between neural network representations, comprising the following steps:

S1: extracting representations: predicting, on a reference dataset, with two neural networks required for feature extraction, and in the prediction process, retaining an intermediate layer output of the neural networks when predicting each sample;

S2: learning weights: learning a weight of each filter in an intermediate layer corresponding to each semantic concept on the reference dataset using a Net2Vec method;

S3: calculating set IoU: linearly superimposing, using the weights learned in step S2, activation values of the filters in the intermediate layer output retained in step S1 to obtain a total activation value corresponding to each semantic concept, then binarizing the total activation value to obtain a mask of each sample corresponding to each semantic concept, and calculating the set IoU of each representation corresponding to each semantic concept; and S4: integrating variance: calculating a variance between the set IoU of the representations of the two neural networks for all semantic concepts, and integrating the variance to obtain semantic variance between two neural network representations.

2. The method for quantifying semantic variance between neural network representations according to claim 1, wherein the Net2Vec method in step S2 is specifically as follows:

calculating a predicted segmentation mask $M(x; w)$ using a Sigmoid function a according to the following equation:

$$M(x; w) = \sigma\left(\sum_k w_k \cdot A_k(x)\right)$$

wherein $w \in \mathbb{R}^K$ is a weight to be learned, K is a total number of filters in the intermediate layer, and $A_k(x)$ is an activation map of a $k^{th}$ filter for input x;

learning the weight w for a concept c by minimizing a binary cross entropy loss function of the following equation:

$$\mathcal{L}_1 = -\frac{1}{N_c} \sum_{x \in X_c} \alpha M(x; w) L_c(x) + (1-\alpha)(1 - M(x; w))(1 - L_c(x))$$

wherein $N_c$ is a number of samples containing the concept c, $x \in X_c$ represents the samples containing the concept c, and $\alpha = 1 - \sum_{x \in X_c} |L_c(x)|/S$, wherein $|L_c(x)|$ is a number of foreground pixels of the concept c in a ground truth mask of the sample x, and $S = h_s \cdot w_s$ is a total number of pixels in the ground truth mask.

3. The method for quantifying semantic variance between neural network representations according to claim 2, wherein in step S3, for the set IoU of the concept c:

$$IoU_{set}(c; M) = \frac{\sum_{x \in X_c} |M(x) \cap L_c(x)|}{\sum_{x \in X_c} |M(x) \cup L_c(x)|}$$

wherein $L_c$ is a ground truth segmentation mask.

4. The method for quantifying semantic variance between neural network representations according to claim 3, wherein in step S4, the variance between the set IoU of the representations of the two neural networks for all semantic concepts are integrated as follows:

$$S \cdot Var(R_2; R_1) = \sum_{j=1}^{c} \frac{\alpha S \cdot Var_j^1 + \lambda(1-\alpha) S \cdot Var_j^2}{\frac{\sum_{k \in X_R} |L_j(x)|}{|X_R| S}}$$

wherein $\alpha = I(\min(IoU_{set}(c_j; R_2), IoU_{set}(c_j; R_1)) > 0)$ determines whether the concept $c_j$ is a common concept between two representations, $\alpha = 1$ if $c_j$ is the common concept, otherwise $\alpha = 0$, $I(\cdot)$ is an indicator function, $X_R$ is the reference dataset, $|L_j(x)|$ is a number of foreground pixels of the concept $c_j$ in the ground truth mask of the sample x, $|X_R|$ is a total number of samples in the reference dataset, $S = h_s \cdot w_s$ is a total number of pixels in the ground truth mask, $S \cdot Var_j^1$ is a semantic variance of common semantic concept between representations $R_1$ and $R_2$ of the two neural networks, $S \cdot Var_j^2$ is a semantic variance of non-common semantic concept between two representations, and $\lambda$ is a weight for the concept that newly appears or disappears in representation $R_2$ compared to representation $R_1$.

5. The method for quantifying semantic variance between neural network representations according to claim 2, wherein in step S4, the variance between the set IoU of the representations of the two neural networks for all semantic concepts are integrated as follows:

$$S \cdot Var(R_2; R_1) = \sum_{j=1}^{c} \frac{\alpha S \cdot Var_j^1 + \lambda(1-\alpha) S \cdot Var_j^2}{\frac{\sum_{k \in X_R} |L_j(x)|}{|X_R| S}}$$

wherein $\alpha = I(\min(IoU_{set}(c_j; R_2), IoU_{set}(c_j; R_1)) > 0)$ determines whether the concept $c_j$ is a common concept between two representations, $\alpha = 1$ if $c_j$ is the common concept, otherwise $\alpha = 0$, $I(\cdot)$ is an indicator function, $X_R$ is the reference dataset, $|(L_j(x)|$ is a number of foreground pixels of the concept $c_j$ in the ground truth mask of the sample x, $|X_R|$ is a total number of samples in the reference dataset, $S = h_s \cdot w_s$ is a total number of pixels in the ground truth mask, $S \cdot Var_j^1$ is a semantic variance of common semantic concept between representations $R_1$ and $R_2$ of the two neural networks, $S \cdot Var_j^2$ is a semantic variance of non-common semantic concept between two representations, and $\lambda$ is a weight for the concept that newly appears or disappears in representation $R_2$ compared to representation $R_1$.

6. The method for quantifying semantic variance between neural network representations according to claim 5, wherein the semantic variance of common semantic concept between representations $R_1$ and $R_2$ of the two neural networks is calculated according to the following equation to obtain a semantic variance of $R_2$ relative to $R_1$:

$$S \cdot Var_j^1 = \frac{IoU_{set}(c_j; R_2) - IoU_{set}(c_j; R_1)}{\max(IoU_{set}(c_j; R_2), IoU_{set}(c_j; R_1))}$$

wherein $IoU_{set}(c_j; R_i)_{j=1 \ldots C}$ is the set IoU of the representation $R_i$ corresponding to each semantic concept, and C is a total number of concepts;

the semantic variance of non-common semantic concept between two representations is calculated according to the following equation to obtain a semantic variance of $R_2$ relative to $R_1$:

$$S \cdot \text{Var}_j^2 = \frac{IoU_{set}(c_j; R_2) - IoU_{set}(c_j; R_1)}{\frac{1}{C}\sum_{k=1}^{C} IoU_{set}(c_k; R_1)}.$$

7. The method for quantifying semantic variance between neural network representations according to claim 6, wherein a value of $\lambda$ is 2.

8. A system for quantifying semantic variance between neural network representations, comprising a computer program, wherein steps of any above method are implemented when the computer program is executed by a processor.

* * * * *